July 14, 1959 R. T. TOWNSEND 2,894,496
INTERNAL COMBUSTION ENGINE
Filed July 16, 1956 3 Sheets-Sheet 1

Inventor
Ray T. Townsend
by Bair, Freeman & Molinare
Attorneys

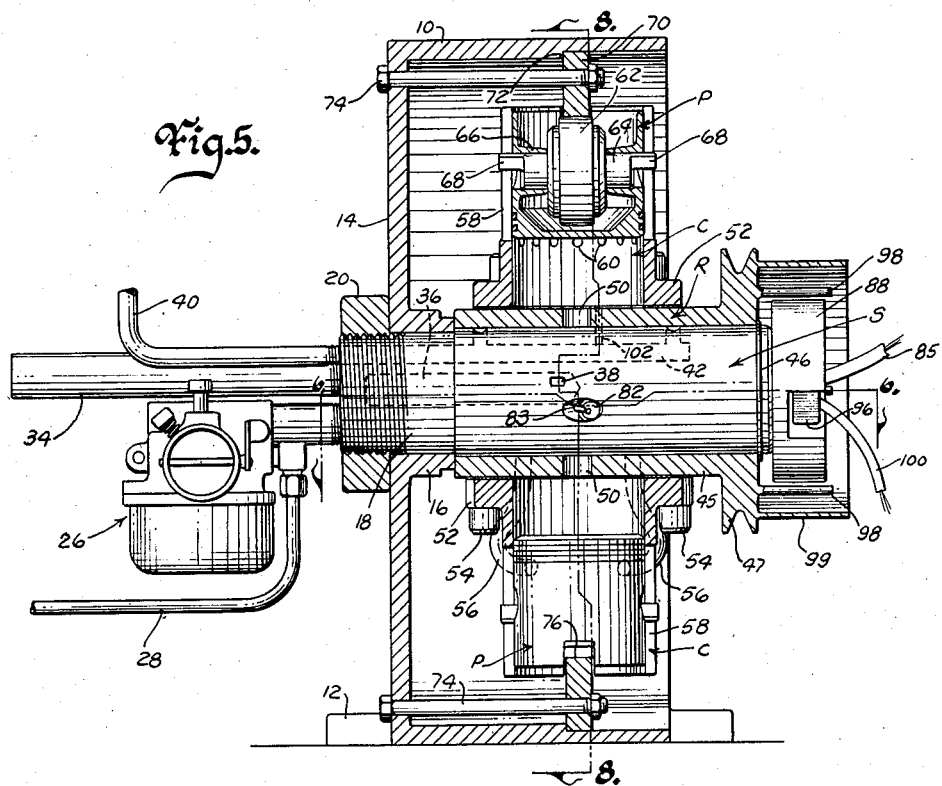
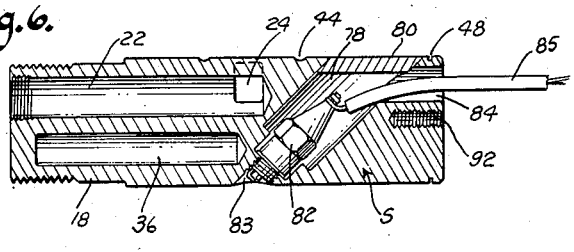
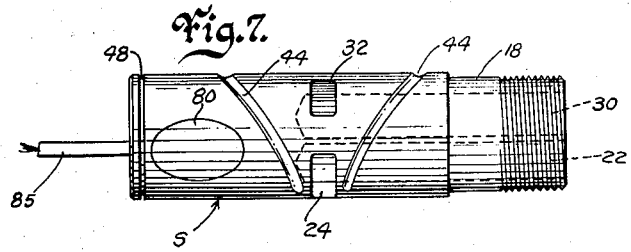

July 14, 1959  R. T. TOWNSEND  2,894,496
INTERNAL COMBUSTION ENGINE
Filed July 16, 1956  3 Sheets-Sheet 3

Inventor
Ray T. Townsend
by Bair, Freeman & Molinare
Attorneys

United States Patent Office

2,894,496
Patented July 14, 1959

2,894,496

INTERNAL COMBUSTION ENGINE

Ray T. Townsend, Des Moines, Iowa, assignor to Townsend Engineering Company, Des Moines, Iowa, a corporation of Iowa Application July 16, 1956, Serial No. 598,052

5 Claims. (Cl. 123—44)

This invention relates to improvements in internal combustion engines which make it possible to simplify the construction and manufacture thereof and to produce engines of increased efficiency and less size in comparison to conventional types of engines.

One object of the invention is to provide an exhaust arrangement of novel construction which employs a rotary valve but does not subject it to the full heat of the products of combustion, thereby preventing early failure of the rotary valve as experienced when exhausting all of the products of combustion therethrough.

Another object is to provide a construction designed to prevent excessive pressure exerted against cam, cam follower and cam follower bearings in a type of engine where the pistons are actuated by a cam, which in conventional engines is experienced particularly at the beginning of the power stroke.

A further object is to provide a means for cooling and scavenging the products of combustion from around the spark plug of the engine, my spark plug arrangement being such that a single spark plug is so associated with all cylinders of the engine as to ignite the combustible mixtures in each thereof instead of providing a spark plug for each cylinder.

Still a further object is to provide a lubrication arrangement in which centrifugal force is used as a means to force oil to the moving parts of the engine and to also utilize centrifugal force to prevent this oil from feeding back into its combustion chambers.

With these and other objects in view, my invention consists in the construction, arrangement and combination of the various parts of my internal combustion engine, whereby the objects above contemplated are attained, as hereinafter more fully set forth, pointed out in my claims and illustrated in detail on the accompanying drawings, wherein:

Fig. 1 is an end elevation of my internal combustion engine embodying my invention;

Figs. 2 and 3 are sectional views on the lines 2—2 and 3—3 respectively of Fig. 1 showing details of a cylinder, piston therein and associated parts;

Fig. 5 is a vertical sectional view on the line 5—5 of Fig. 1 and shows a stationary shaft of the engine in elevation;

Fig. 6 is a horizontal sectional view on the line 6—6 of Fig. 5 showing details of the shaft;

Fig. 7 is an elevation of the shaft viewed from the opposite side with respect to that shown in Fig. 5;

Figure 1:
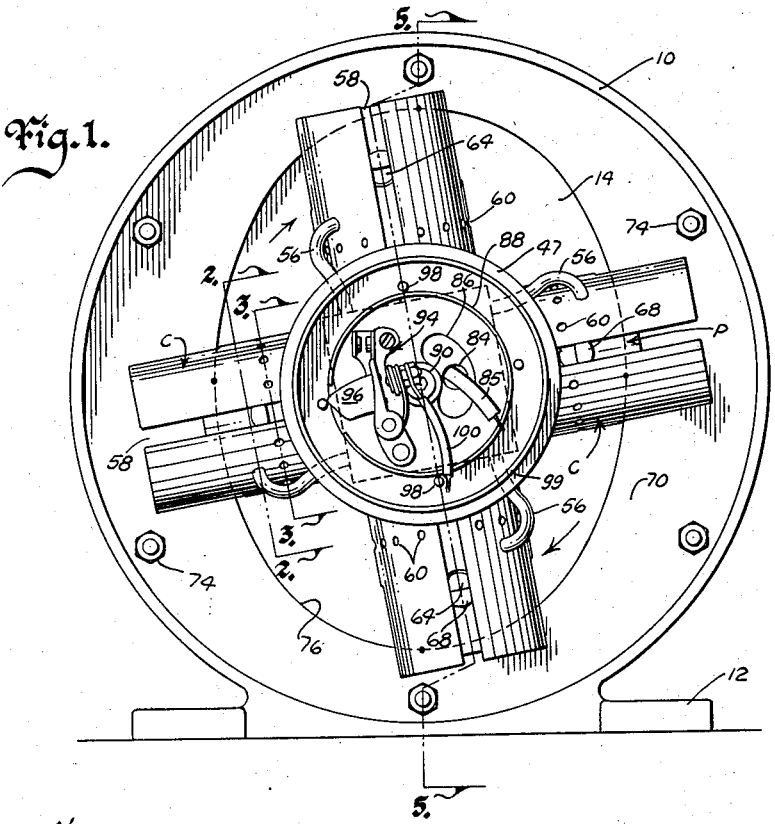

On the accompanying drawings I have used the reference numeral 10 to indicate a cylindrical housing for my engine. Mounting feet 12 are provided therefor adjacent the bottom of the housing. The housing includes an end plate 14 from which projects a hub 16.

I provide a stationary shaft indicated generally at S which has a reduced end 18 received in the hub 16 and retained therein by a nut 20. The shaft S has an intake cavity 22 communicating with an intake port 24, and a carburetor 26 is connected therewith to supply combustible gas thereto, the fuel line to the carburetor being illustrated at 28. The shaft S also has an exhaust cavity 30 with which an exhaust port 32 communicates, and an exhaust pipe 34 extends from the exhaust cavity 30 to conduct the products of combustion therefrom. The shaft S also has a surge cavity 36 the purpose of which will hereinafter appear, and this cavity communicates with a surge cavity port 38.

An oil supply pipe 40 extends into the shaft S and communicates with an oil cavity 42 therein which in turn communicates with a pair of oil grooves 44.

Figure 2:
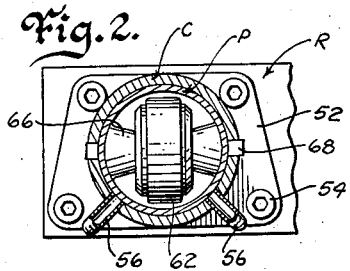
Figure 3:
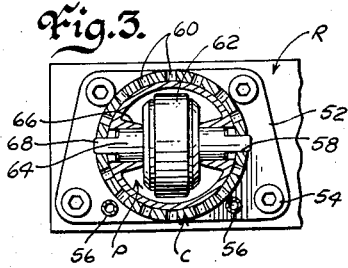

I provide a rotor R rotatable on the shaft S and retained thereon by a retainer washer 46 in a groove 48 of the shaft. The rotor R may have a pulley 47 for power take-off and has a cylinder port 50 for each one of cylinders C. Each cylinder C has a piston P therein and the cylinder is mounted on the rotor R by means of a cylinder mounting flange 52 (see Figs. 2 and 3) and cylinder mounting screws 53. Cylinder oil pipes 56 (one pair for each cylinder C) are provided for conducting oil from the grooves 44 of rotor R (and the shaft S) to the cylinders C as will later be described. Each cylinder C is provided with a pair of opposite slots 58 and with primary exhaust ports 60. The ports 60 are arranged circumferentially therearound as obvious from the drawings.

Each piston P is provided with a roller 62 which is rotatable on a shaft 64 carried by the piston. The piston has roller shaft hubs 66 to support the shaft 64, and the shaft has a pair of projections 68 extending into the opposite slots 58 of the cylinder C for keeping the rollers 62 properly aligned relative to a cam therefor.

Figure 8:
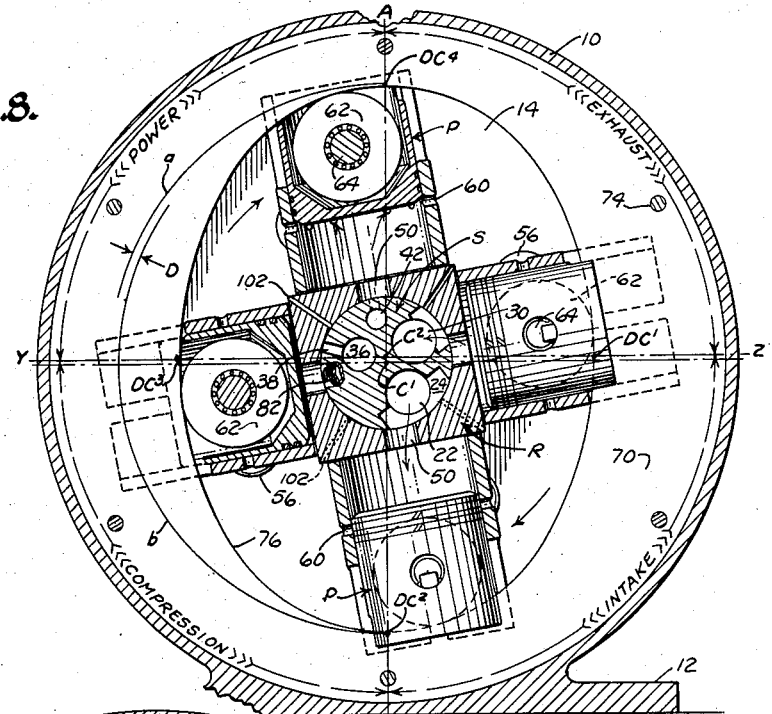
Fig. 8 is a vertical sectional view on the line 8—8 of Fig. 5 showing the cylinders and pistons in one position.

The cam just referred to is indicated at 70 and is in the form of a washer-like disc held against a shoulder 72 of the housing 10 by tie bolts 74. The cam 70, as shown in Fig. 8 particularly, has an internal cam surface 76 which is elliptical. The ellipse is slightly off center with respect to the axis of rotation of the rotor R for a purpose which will hereinafter appear and as will now be explained in connection with Fig. 8.

A vertical center line AB is illustrated and a horizontal center line YZ. YZ passes through $C^2$ which is the center for the ellipse 76 and which is displaced above the center $C^1$ that represents the center of rotation of the rotor R and likewise the cylinders C around the shaft S. The magnitude of the displacement is a little greater than one-half the diameter of the primary exhaust ports 60 of the cylinders C which makes a total displacement substantially equal to the dimension D in the upper left quarter of Fig. 8, the arcs $a$ and $b$ being on radii from the centers $C^2$ and $C^1$ respectively.

Inner dead centers $DC^1$ and $DC^3$ are illustrated on the ellipse 76, and outer dead centers $DC^2$ and $DC^4$. Also in Fig. 8 the intake, compression, power and exhaust quarters of a four cycle operation are indicated.

In respect to further details of construction, the shaft S as shown in Fig. 6 has a spark plug cavity 78 therein and a closure plug 80 is provided for the cavity. A spark plug 82 is mounted in the cavity and the electrodes thereof open into a spark plug port 83. An opening 84 into the cavity 78 provides for the high tension spark plug wire 85. An ignition timer housing 88 is mounted on the right-hand end of the shaft S in Fig. 5 as by a screw 90 illustrated in Fig. 1 and has an arcuate slot 86 registering with the opening 84 to permit oscillating adjustment of the housing 88 to change the ignition timing. In Fig. 6 a threaded opening 92 is illustrated for the screw 90.

The usual circuit-breaker type of ignition timer is illustrated at 94 (Fig. 1) having a cam 96 adapted to be actuated by pins 98, one for each cylinder C. A protective housing 99 is illustrated surrounding the pins 98. An ignition wire 100 extends from the ignition timer 94 for connecting the timer in the primary circuit of a spark coil in the usual manner, the secondary of which connects to the spark plug wire 85.

In the prior art there are many instances of internal combustion engines having cylinders arranged radially with the force of the power stroke exerted against a cam in such a way as to cause rotation without the use of connecting rods and a crank shaft. Since these cylinders are arranged radially around a shaft and rotate with respect thereto, it is possible to port the intake and exhaust through the shaft and thereby create a very simplified valving mechanism as well as being able to simplify the ignition timing.

Two major factors that interfere with the success of this arrangement are (1) exhausting gas through a rotary valve subjects the valve to excessive heat causing early failure of the valve, and (2) excessive pressures exerted against the cam follower bearings due to the high instantaneous combustion forces exerted by the piston at the beginning of the power stroke, place a strain on the parts and wear them excessively.

These factors are also a problem in a conventional reciprocating crank-type engine but the more massive design of the crank bearings makes the conventional engine more practical to withstand these forces.

In my engine these problems have been overcome by two novel constructions as will now be discussed. In any internal combustion engine it is important that the timing of the opening and closing of the exhaust port (as well as other elements of an operating cycle) be maintained accurately. This can be very easily arranged when a rotary valve is used in which the port of the stationary member is exposed to the port of the rotating member when the piston is in the position desired in relation to its cylinder and this arrangement is maintained in my design. In addition, however, the primary exhaust ports 60 have been provided in the cylinder wall near the final end of the power stroke so that these ports are opened by the inner ends of the pistons P when adjacent and at the dead center DC⁴ and the intake and exhaust ports 24 and 32 are positioned in the shaft S in relation to the cylinder ports 50 in the rotor R to take this into consideration.

Figure 9:
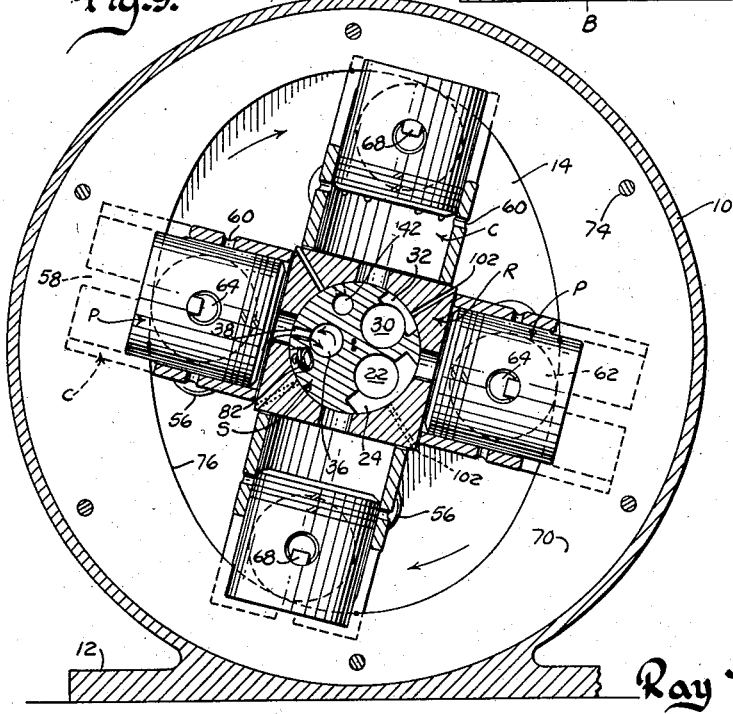
Fig. 9 is a similar sectional view showing them in a different position.

In Fig. 8 the upper piston is about to pass the point DC⁴ and in Fig. 9 it has passed it, and it will be noted that the ports of this one cylinder (and likewise any of the other three cylinders when in the upper position) are uncovered to permit primary exhaust through 60. In this position the products of combustion begin to exhaust and of course at the beginning of the exhausting period the pressure in the cylinder as well as the temperature is higher than at any other time during the exhaust period, so that most of the heat is expelled through the primary exhaust ports 60 in the cylinder wall along with the greater percentage of the products of combustion.

As the exhaust cycle continues and the inner end of the piston covers the ports 60, the exhaust port 32 registers with the cylinder port 50 of the upper cylinder soon after the Fig. 9 position which allows additional exhausting through the rotary valve during the rest of the exhaust quarter of the cycle. This gas exhausting through the rotary valve, however, is at a much lower temperature and pressure than at the beginning of the exhaust cycle. Therefore, the heat to which the rotary valve is exposed is much less than if all exhaust were through it and a practical life can be expected from the rotary valve.

This same principle of exhausting the high temperature portion of the products of combustion through the cylinder wall and the remaining lower temperature gas through the exhaust valve can also be applied to a conventional crank-type engine, either spark ignition type or compression ignition type. However, with a conventional four cycle spark ignition engine, a problem arises in maintaining proper carburetion due to these cylinder exhaust ports being opened to the atmosphere during the end of the intake stroke. Any intake of air through the ports 60 at the end of the intake stroke would dilute the incoming gas mixture and complicate the problem of carburetion and control, but with the proper carburetion control there would be definite advantages in a crank type engine in exhausting the hottest portion of the exhaust gases through the cylinder wall ports to reduce the heat to which the exhaust valves are subjected.

In my cam-actuated piston arrangement I have overcome this problem by shaping the cam to allow a longer stroke of the piston on the power and exhaust strokes and a shorter stroke on the intake and compression strokes so that these cylinder ports 60 are not exposed during the intake and compression strokes. This is accomplished by offsetting the cam surface 76 from the center of rotation of the rotor R as above explained in connection with Fig. 8.

Another advantage of exhausting through the cylinder wall is the fact that an exhaust port of larger capacity can be quickly opened to more suddenly expel most of the high pressure, high temperature gases before the start of the exhaust stroke instead of retaining them longer into the exhaust stroke, thereby reducing the heat problem with respect to the cylinders, pistons, etc., and also reducing the negative work involved due to back-pressure at the beginning of the exhaust stroke and before the exhaust port 32 opens. This arrangement provides further for more complete exhausting and purging of the cylinder so that the residual burned gas in the combustion chamber is less and therefore the dilution of the intake charge is less.

The second novel principle in my engine is a means to reduce the maximum pressure of the power stroke and yet maintain the over-all effective pressure so that the same amount of work is obtained with lower maximum pressures and forces being produced during the early part of the power stroke. This object is accomplished by opening the surge cavity 36 to the combustion chamber at or near the beginning of the power stroke and immediately after ignition so that the products of combustion can expand into this additional chamber, thereby reducing the maximum pressure attained in the combustion chamber. As the power stroke continues and the piston moves from dead center DC³ in Fig. 8 as shown in Fig. 9, the pressures in the combustion chamber as well as the surge chamber reduce but at a much slower rate due to the gas feeding back out of the surge chamber into the cylinder. As the gas is expanded to a pressure not lower than the pressure necessary for suitable ignition, this surge cavity is closed, sealing the gas therein at the pressure it had when the cavity closed and allowing the remaining gas in the cylinder and combustion chamber to expand for the balance of the power stroke.

This surge cavity principle can be adapted to a conventional crank type engine by providing a suitable surge cavity and valving arrangement and the same advantages would apply in this type engine as in my radial cam type engine. However, the rotary valving arrangement of a radial cam type engine simplifies the valving of the surge cavity. The valve timing and the size of the surge cavity can vary considerably but should be arranged to give the most effective and efficient operation.

There are many advantages to this surge cavity principle. First, by reducing the high pressure peak in the power stroke, the forces on the pistons and all associated parts are greatly reduced which, of course, is a great advantage in designing the structural members of an engine. Also, the energy produced by the high rate of combustion at the beginning of the power stroke is stored up in the surge cavity and fed out against the piston farther down the combustion stroke at a time when the rate of movement of the piston is faster and the piston is in a position to more effectively convert this energy into torque. This gives a high torque characteristic to the engine that is very desirable.

Figure 4:
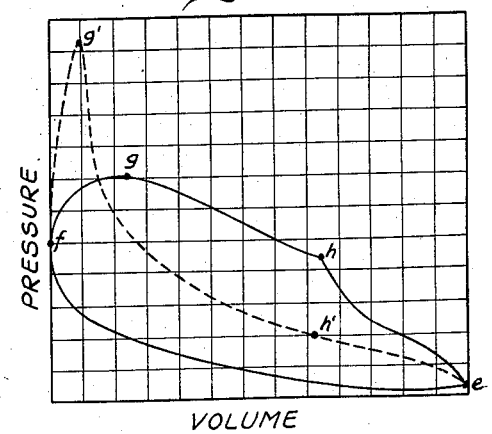
Fig. 4 is a pressure-volume graph for my engine (solid lines) compared to a conventional engine (dotted lines)

Referring to Fig. 4, the solid line graph has a lower portion e—f and an upper portion f—g—h—e. The lower portion e—f indicates the increase in pressure from the beginning of the compression stroke until the end thereof and this same pressure curve is applicable to a conventional crank type engine. The upper part of the pressure curve has three distinct parts f—g and g—h representing the power and expansion strokes, and h—e representing the exhaust stroke. The area enclosed by the graph line e—f—g—h—e represents the power derived from the complete operating cycle of the piston and cylinder.

In the conventional engine, it will be noted that the pressure-volume graph (e—f solid line and f—g'—h'—e dotted line) is somewhat different, having a higher peak g' and a more rapid reduction in pressure during the power and expansion strokes so that the area enclosed by the graph line e—f—g'—h'—e is considerably smaller and therefore represents less delivery of power. Furthermore, it indicates a surge of pressure right after the ignition point f causing greater strain on the mechanical parts of the engine and producing a power stroke which is not nearly as smooth and even pressurewise as I experience with my engine.

In my cam type engine the reduction in the force on the piston as a result of the use of the surge chamber disclosed reduces the load on the cam follower bearings and associated parts, and thereby increases their life considerably which I consider as an advantage of prime importance that makes my type of radial cam engine practical. Another advantage is the fact in conventional engines it is this peak pressure g' portion of the power stroke where detonation knock occurs. Since this peak pressure is reduced in my design, the problem of detonation knock is greatly reduced so that a much higher compression ratio can be used in my engine which greatly increases its efficiency. Also, by reducing the problem of knock in the engine, the need for expensive anti-knock fuels is reduced thereby effecting a further economy.

Another unique principle involved in my radial cam engine is the means for scavenging the burned gas from around the spark plug and at the same time increase the cooling of the plug so that good ignition is provided. In attempting to ignite all cylinders with one spark plug, it was necessary to mount the spark plug in the stationary shaft S in such a way that it would ignite the charge in each cylinder as it passed the plug. Since the spark plug was recessed in a cavity below the bearing surface of the shaft, there was a tendency for burned gas to collect around the spark plug and prevent ignition.

To purge this gas from the spark plug cavity, I provide a small bleed hole 102 through the rotor between the cylinders as shown in section in Fig. 8 so that after each cylinder port has passed the spark plug cavity, the bleed hole will pass over the spark plug cavity and allow the burned gas to bleed therefrom to atmosphere. The bleed hole 102 is out of alignment with the ports 24, 32 and 38 but the spark plug port 83 communicates with the bleed hole. Then as the next cylinder port passes the spark plug, the fresh fuel feeds into the spark plug port and is ignited without difficulty. Also, since the pressure in the spark plug port is reduced by escape through the bleed hole, the temperature is correspondingly reduced, thus making the plug run cooler and compensating for its tendency toward high temperature because of firing for all of the cylinders of the engine.

Another unique principle that I have employed in my radial cam type engine is the utilization of centrifugal forces generated in the rotor R to force oil to the moving parts of the engine such as the pistons, cam follower bearings, etc. This principle involves the suction of oil in through the shaft S and the feeding thereof into the grooves 44 to pass through the wall of the rotor and into the cylinder oil pipes 56 for discharge into the cylinders or to various points where needed. One of the main advantages of this arrangement is the fact that a copious supply of oil can be fed to the piston rings without the danger of this oil feeding back into the combustion chamber and being burned because centrifugal force, due to the rotating cylinder arrangement, will continually tend to carry the oil past the pistons and away from the combustion chamber which is located next to the shaft.

Some changes may be made in the construction and arrangement of the parts of my internal combustion engine without departing from the real spirit and purpose of my invention, and it is my intention to cover by my claims any modified forms of structure or use of mechanical equivalents which may reasonably be included within their scope.

I claim as my invention:

1. In a four cycle internal combustion engine, a stationary shaft, a rotor rotatable thereon, a cylinder carried by said rotor, a piston therein, a stationary cam for reciprocating said piston in said cylinder upon rotation of said rotor, said shaft being provided with intake and exhaust ports for said cylinder, said rotor having a cylinder port for registry therewith during rotation of said rotor relative to said shaft, a spark plug port in said shaft to register with said cylinder port, a spark plug therein, and said rotor having a vent to atmosphere which registers with said spark plug port between successive firings of the plug to scavenge exhaust gas therefrom and reduce the temperature thereof.

2. A four cycle internal combustion engine comprising a stationary shaft, a rotor rotatable thereon, a cylinder carried by said rotor, a piston therein, a stationary cam for reciprocating said piston in said cylinder upon rotation of said rotor, intake and exhaust valves for said cylinder, said rotor having a cylinder port, a spark plug port in said shaft to register with said cylinder port during rotation of said rotor relative to said shaft, a spark plug in said spark plug port, said rotor having a vent to atmosphere which registers with said spark plug port between successive firings of said spark plug to scavenge exhaust gas therefrom.

3. In a four cycle internal combustion engine, a cylinder, a piston therein, means for reciprocating said piston in said cylinder, intake and exhaust valves for said cylinder, said cylinder having a port, a spark plug port to register with said cylinder port adjacent the end of the compression stroke, a spark plug therein, and means to vent said spark plug port to atmosphere between successive firings of the plug therein to scavenge exhaust gas from said spark plug port comprising a vent opening to register with said spark plug port after said cylinder port has been closed relative to said spark plug port.

4. An internal combustion engine including a cylinder, a shaft and a housing for said shaft, said shaft and housing being relatively rotatable and constituting valve and firing means for the engine, said shaft being provided with intake and exhaust ports for said cylinder, said housing having a cylinder port for registry with said intake and exhaust ports during relative rotation of said shaft and housing, a spark plug port in said shaft to register with said cylinder port, and a spark plug therein, said housing having a vent to atmosphere which registers with said spark plug port between successive firings of said spark plug to scavenge exhaust gas therefrom and reduce the temperature thereof.

5. An internal combustion engine including a cylinder, and intake and exhaust valves therefor, said cylinder having a port, a spark plug port to register with said cylinder port adjacent the end of the compression stroke, a spark plug in said spark plug port, and means to vent said spark plug port to atmosphere between successive firings of the plug therein to scavenge exhaust gas from said spark plug port comprising a vent opening to register with said spark plug port after said cylinder port has been closed relative to said spark plug port.

References Cited in the file of this patent

UNITED STATES PATENTS

| | | |
|---|---|---|
| 1,112,905 | Heath | Oct. 6, 1914 |
| 1,276,351 | Halsey | Aug. 20, 1918 |
| 1,282,824 | Hartson | Oct. 29, 1918 |
| 1,312,585 | Shepherd | Aug. 12, 1919 |
| 1,324,408 | Ragot et al. | Dec. 9, 1919 |
| 1,750,063 | Sorg | Mar. 11, 1930 |
| 1,827,094 | McCann | Oct. 13, 1931 |
| 2,062,013 | Opolo | Nov. 24, 1936 |
| 2,280,669 | Sklenar | Apr. 21, 1942 |
| 2,500,409 | Hawkins | Mar. 14, 1950 |

FOREIGN PATENTS

| | | |
|---|---|---|
| 22,766 | Great Britain | Oct. 16, 1911 |